United States Patent
Dimitrov et al.

(10) Patent No.: US 6,900,757 B1
(45) Date of Patent: May 31, 2005

(54) METHOD FOR IDETIFICATION SATELLITES ARRANGED ON GEO ORBIT

(75) Inventors: Milen Dimitrov, Pernik (BG); Dimitar Mishev, Sofia (BG); Todor Krastev, Elin Pelin (BG); Boyan Yakimov, Sofia (BG); Nikolay Kratchunov, Sofia (BG)

(73) Assignee: Skygate International Technology N.V., Antillies (BG)

( * ) Notice: Subject to any disclaimer, the term of this patent is extended or adjusted under 35 U.S.C. 154(b) by 0 days.

(21) Appl. No.: 10/481,107

(22) PCT Filed: Jul. 3, 2002

(86) PCT No.: PCT/BG02/00017

§ 371 (c)(1),
(2), (4) Date: Dec. 17, 2003

(87) PCT Pub. No.: WO03/005483

PCT Pub. Date: Jan. 16, 2003

(30) Foreign Application Priority Data

Jul. 6, 2001  (BG) ............................................. 105680

(51) Int. Cl.$^7$ ............................................. H04B 7/185
(52) U.S. Cl. .................. 342/357.01; 342/352; 342/359
(58) Field of Search .............................. 342/356, 352, 342/357.01, 357.14, 357.15, 357.16, 359; 455/12.1, 13.2, 13.4

(56) References Cited

U.S. PATENT DOCUMENTS 5,376,941 A   12/1994  Fukazawa 6,195,555 B1 *  2/2001  Dent ........................ 455/456.2
6,233,451 B1 *  5/2001  Noerpel et al. .............. 455/427
6,684,071 B1 *  1/2004  Molnar et al. .............. 455/429

FOREIGN PATENT DOCUMENTS

EP    0 579 407 A    1/1994
FR    2 581 798 A    11/1986

* cited by examiner

Primary Examiner—Dao Phan
(74) Attorney, Agent, or Firm—Nexsen Pruet Adams Kleemeier, LLC; Michael A. Mann

(57) ABSTRACT

The method for identification of a set of satellites, arranged on GEO orbit, consists of receiving satellite signals; determining antenna beams strength; detecting beams that are local maximums according to the antenna structure, defined by the number of beams and their coordinates in the antenna plane; and approximating the GEO orbit using the strength of the received signals, wherein the satellites' identification is carried out through the local maximums situated on or in a defined range of the approximated GEO curve, according to the information for the geographic position of each satellite and the antenna orientation. Projection probability coefficients of a given satellite in a given area of the antenna plane are used for satellites' identifications. The information about the geographic position of each satellite may be corrected by azimuth, elevation and roll angles, according to the inaccuracy of the antenna installation. It is possible after detection of the strength of each beam to introduce a correction, reflecting the signal-to-noise ratio. In this case, it is expedient to amplify the signals corresponding to the received signals' strengths by the square or bi-square law.

5 Claims, 15 Drawing Sheets

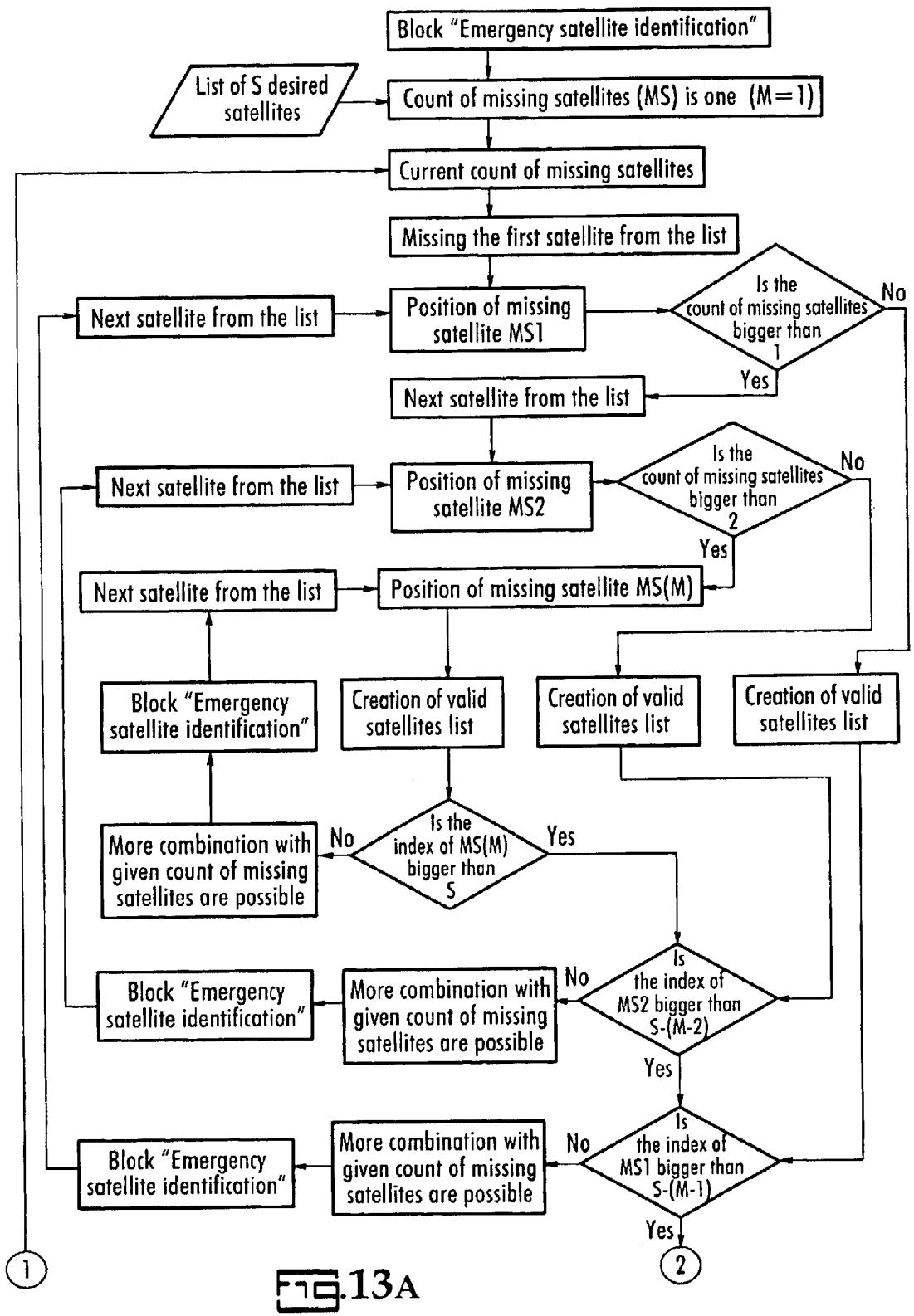

METHOD FOR IDETIFICATION SATELLITES ARRANGED ON GEO ORBIT

TECHNICAL FIELD

The present invention treats the method for identification of set of satellites, arranged on GEO orbit applicable in telecommunications.

PRIOR ART

It is worldwide known a method for satellite identification, based on radiating of unique satellite identification (ID) code that is received from the terrestrial equipment of the satellite antenna, and after decoding it is determine the radiating satellite.

A disadvantage of this familiar method is a long time for identification and the possibility for mistakes appearing in the ID codes, which are due to changes in the environment conditions, fluctuations of the signals in the electronic devices of the antenna and etc. Furthermore, the method requires specific hardware devices for broadcasting, receiving and decoding of the ID signals. These specific hardware modules leads to complication of the receiving equipment that implements the method and decreases the reliability of the telecommunications.

From the patent RU No. 2 14 675 is known a method for defining the position of a broadcasting source in case of multi-beam radiation. The method consists of:

acceptance of the signals from an N-element phased-array antenna, formation of scanning signals in a given angle sector, determination of the weight coefficients and multiplication with the respective scanning signals, memorizing of the received signals, and selecting from them of the angle values with the maximum strength of the received signal.

This familiar method is intended for implement of a mobile radio communication and does not provide identification of the broadcasting source.

SUMMARY OF THE INVENTION

The purpose of the present invention is to create a method for identification of set of satellites located on GEO orbit, that ensuring a correct identification of two or more satellites by simplifying of the transmitting and receiving part of the telecommunication system and respectively increasing the reliability of the telecommunications.

The purpose is achieved with creation of a method for identification of set of satellites, situated on GEO orbit, based on the received signals radiated from the satellites, and characterized by the following step:

determination of the antenna beams signal level detection of the local maximums according to the antenna structure, defined by the number of beams and their coordinates in the antenna plane;

approximation of the GEO orbit using the strength of the received signals wherein, the satellites identification is carried out by local maximums located on or near to the approximated GEO curve, and according to the information of the geographic position of each satellite and antenna orientation.

In one variant of the execution of the method for satellites identification are used probability coefficients for the projection of each satellite in a given area of the antenna plane.

It is expedient, the information of the geographic position of each satellite to be corrected by Azimuth, Elevation and Roll angles according to the antenna installation inaccuracy.

In addition, it is suitable after determination of the signal level of all the beams to introduce a correction, reflecting to the signal/noise ratio. In this case it is expedient, the signals corresponding to the strength of the received signals, to be amplified by square or bi-square law.

The advantages of the method for identification of set of satellites, located on GEO orbit, consists of correct identification of each satellite from the set without the need using complex and expensive decoding modules in the receiving satellite equipments. By implementation of the method according to the invention, the reliability of the telecommunications is increased, since by decreasing the number of elements comprising the telecommunication system, failure probability of given elements is reduced.

BRIEF DESCRIPTION OF THE DRAWINGS

The method for identification of set of satellites, located on GEO orbit, is illustrated by the enclosed drawings:

FIGS. 13a and 13B—flowcharts representing the block "Finding of missing satellites" in case of critical circumstances;

EXAMPLES FOR EXECUTION OF THE INVENTION

Figure 1:
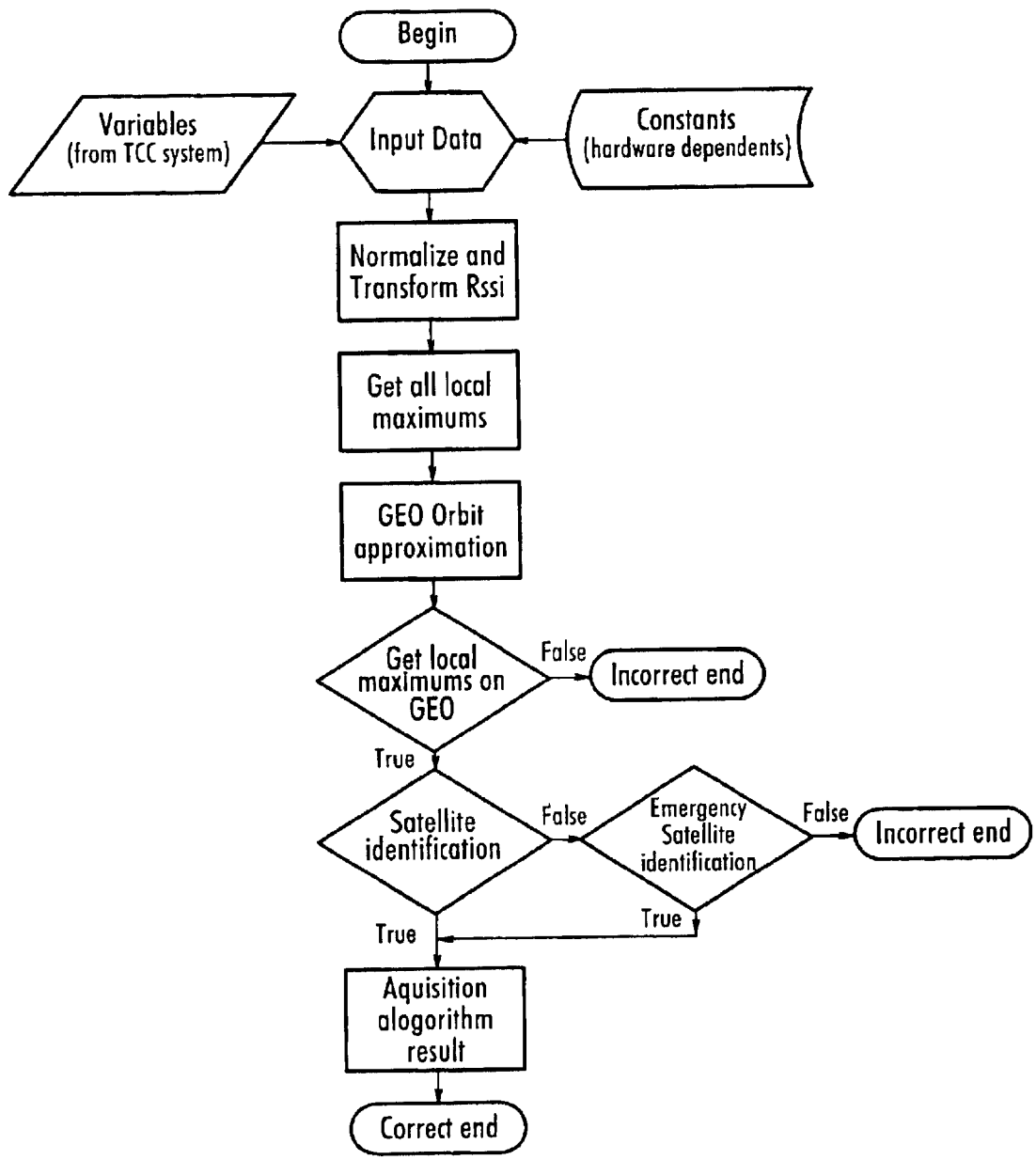
FIG. 1—flowchart representing the algorithm for identification of set of satellites by the method according to the invention.
Figure 2:
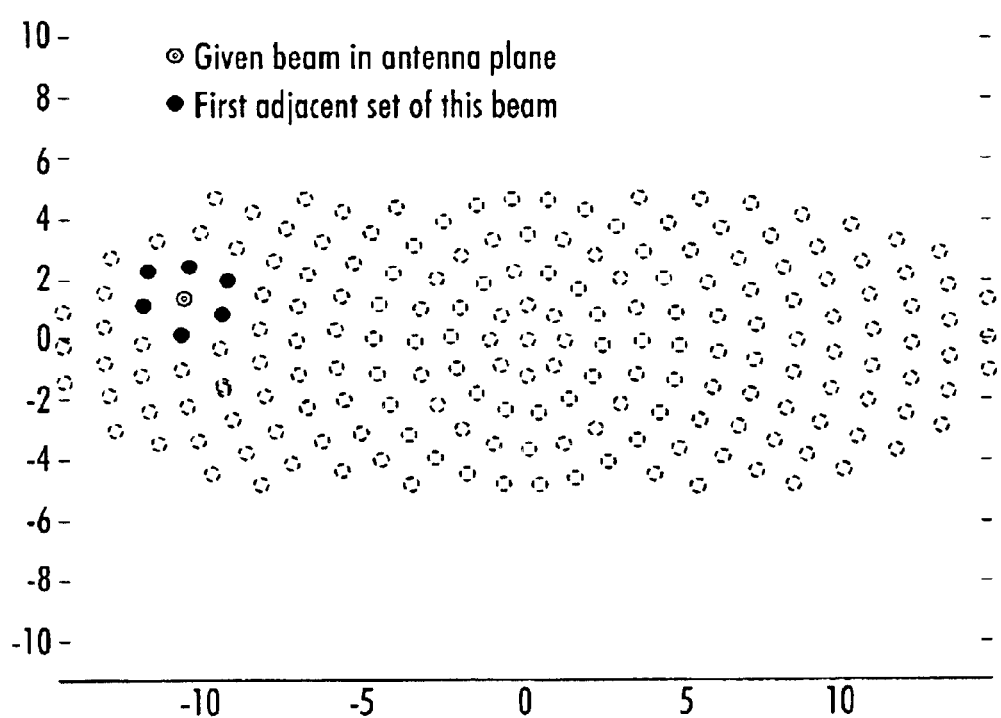
FIG. 2—chart representing the concept "the, first adjacent set of a given beam"
Figure 3:
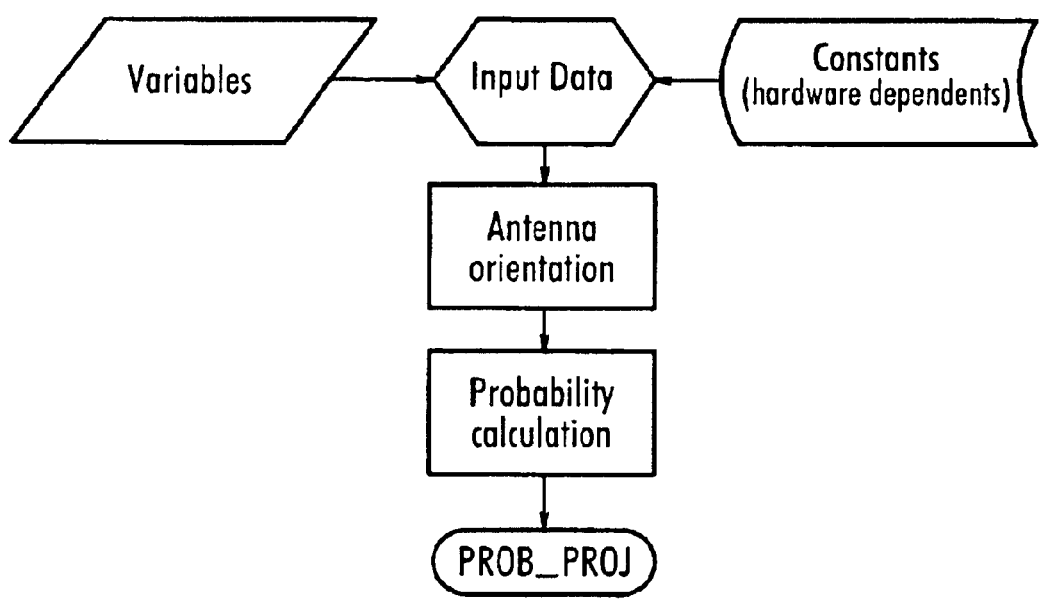
FIG. 3—flowchart representing the means of calculation of the satellite statistical probability projections in given area of the antenna plane.
Figure 4:
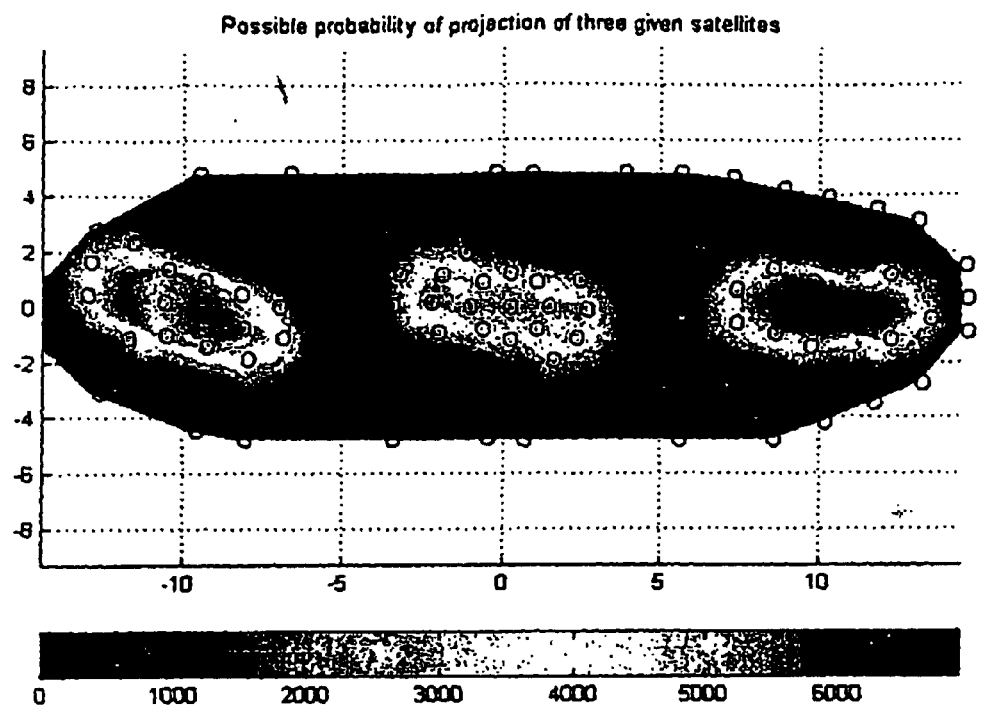
FIG. 4—chart representing the satellites probability projection in given area of the antenna plane.
Figure 5:
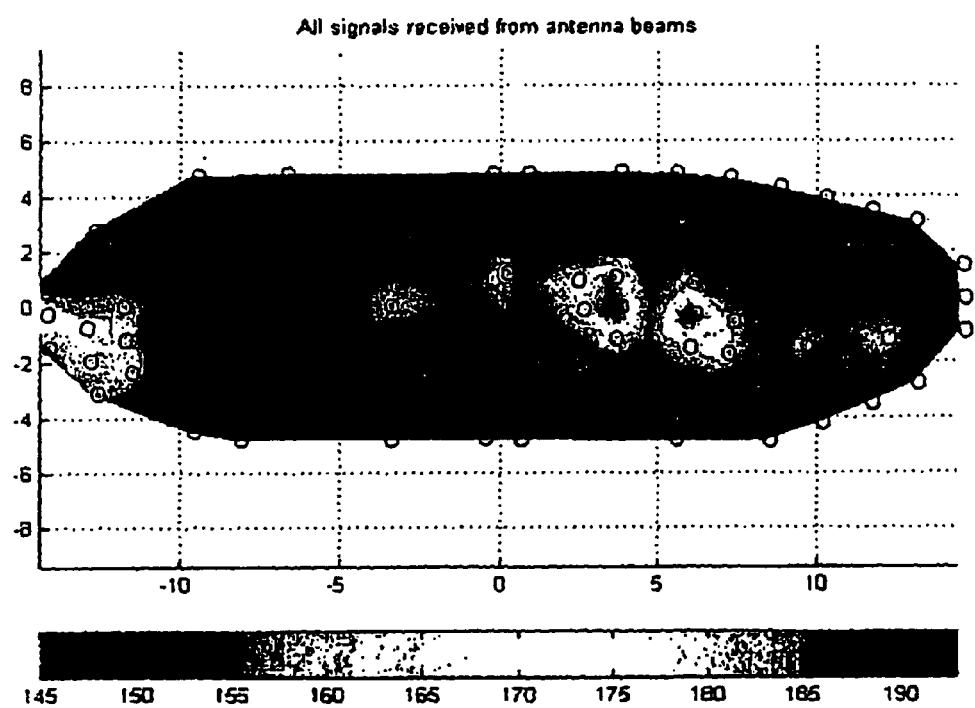
FIG. 5—chart representing all the received signals by the antenna's beams.

The method for identification of set of satellites, located on GEO orbit, according to the invention is illustrated by the algorithm flowchart on FIG. 1. Input data, necessary for satellites identification, are variables and constants. The variables carry information for the strength of the received signal from each beam of the antenna and generally shown as RSSI—Received Signal Strength Indicator. The constants or hardware dependent data are:

satellites location—information about the satellites longitudes;

antenna structure—information about the number of the beams and their coordinates in the antenna plane;

beams arrangement (LINK_LIST)—it is an array containing indexes of beams from the first adjacent set. FIG. 2, illustrates the concept "first adjacent set" of the given beam. On FIG. 2, the beams in this first adjacent set are marked in black color;

additional information about the arrangement of the beams (END_ADJ_SET)—it is an array filled with count of the beams from the first adjacent set;

projections statistical probability of the set of satellites in the antenna plane (PROB_PROJ)—defines the probability of a given beam to be directed towards a given satellite. This probability for the desired set of satellites is calculated in advance or a given geographical region, which the antenna will operate in. Determination of the statistical probability is illustrated on FIG. 3. Variables as antenna's longitude and latitude, and constants as satellites location, antenna's structure, Earth radius (6378.16 km) and GEO orbit altitude (for example 35786.43 km) are inputs for the block "The antenna orientation". This block calculates satellite's Azimuth and Elevation angles in the antenna plate. The purpose is orientation of boresight (beam oriented in direction at angle 90° with respect to the antenna plane) of the antenna (for multi-beams antenna) or orientation of the antenna (in single beam antenna) to a given satellite. After these operations, the block calculates the probability of a given satellite to fall into a given beam of the antenna. Block "PROB_PROJ" generates weight coefficients, which are proportional of the probability a given beam to be directed to a given satellite. FIG. 4 shows the distribution of probabilities in the antenna plane, and the areas with lighter spice reflect greater projection probability of a given satellite.

The input data (FIG. 1) is processed in the block "Input RSSI processing". For suppressing of the noise and amplification of the useful signal level, it is suitable to normalize the signal. For this purpose the RSSI values are subjected to square or bi-square law amplification.

Figure 6:
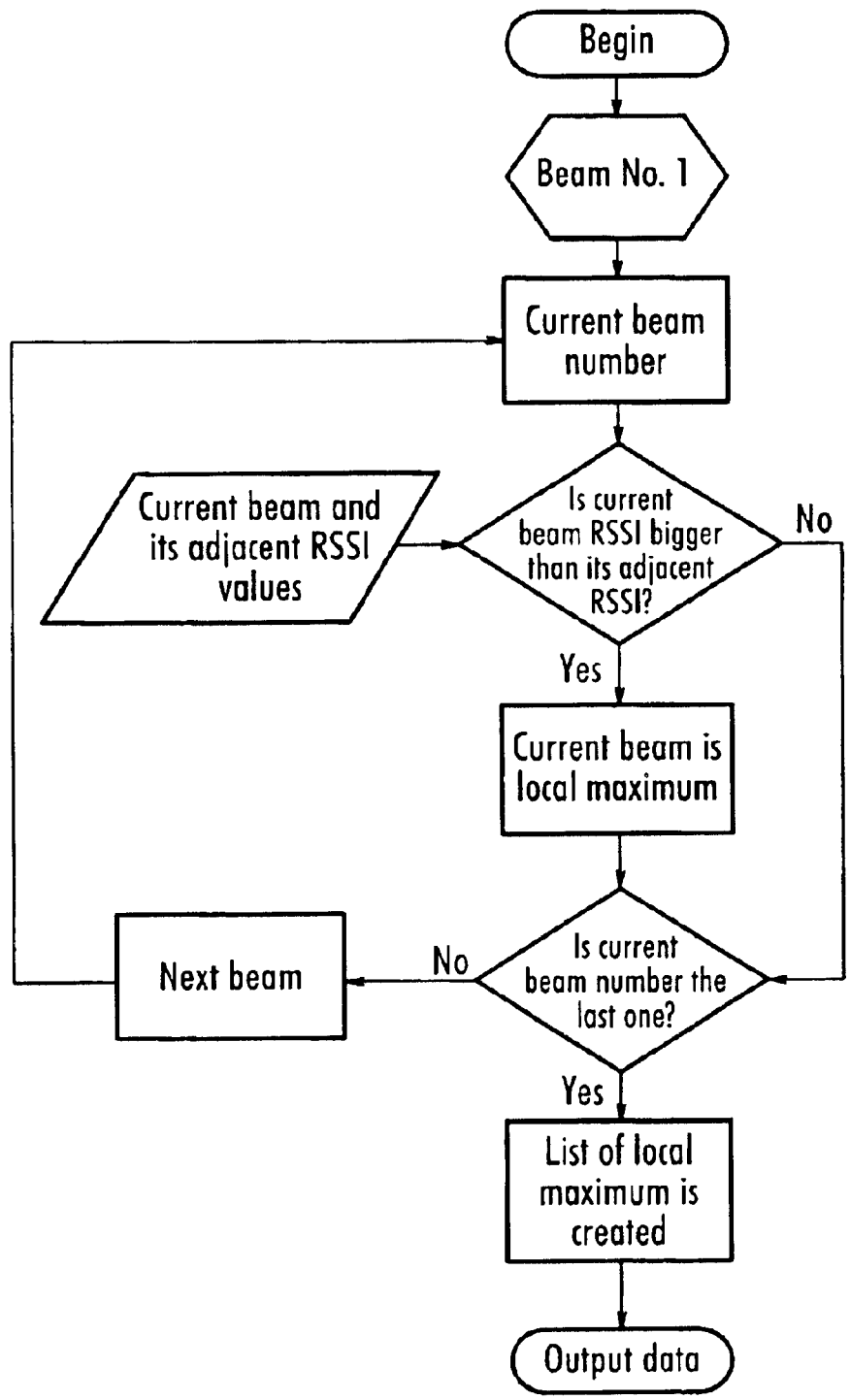
FIG. 6—flowchart representing local maximums detecting algorithm.
Figure 7:
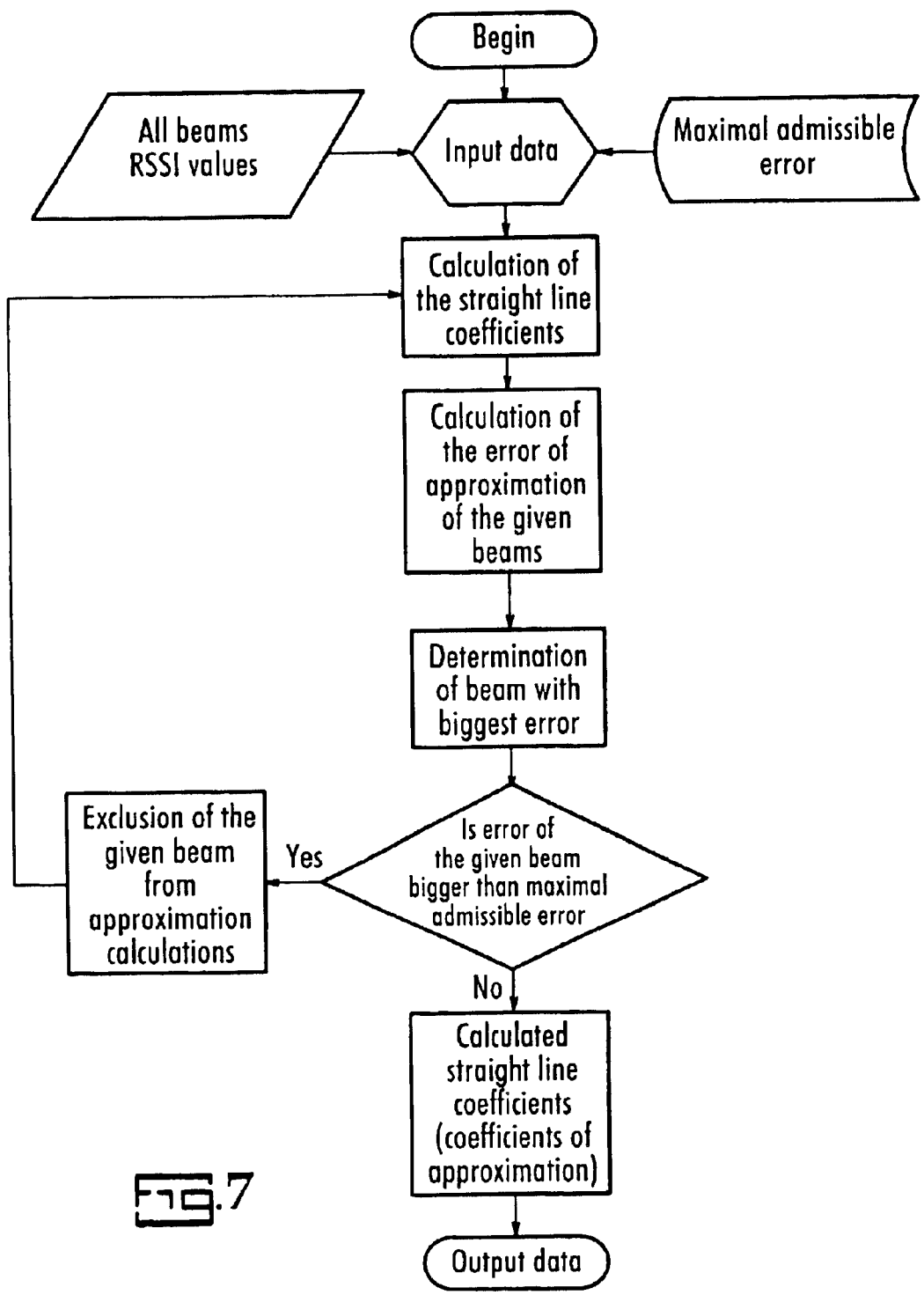
FIG. 7—flowchart representing the approximation of the GEO orbit.

Further, the normalized values are used for finding of all the local maximums. This action is performed by consecutively processing of all the beams (FIG. 6). It checks whether the RSSI values of a given beam are bigger than RSSI values of the adjacent beams. If that condition is true, this beam presents a local maximum. If the RSSI values of a given beam are not bigger than beams of the adjacent set, the next beam is analyzed. This operation is repeated until the list of the beams with the local maximums is filled.

Next step after finding of all local maximums is approximation of the GEO orbit. First order polynomial approximation of least-square method is used. The choice of method for approximation depends on maximal permissible error for a given case. For the approximation, the normalized RSSI values are used as weight coefficients of sought function for decreasing the influence of the noise signals, respectively for more precise approximation. Coefficients of the approximated line and the error of approximation are calculated according to preliminary data that contain the maximal admissible error and RSSI values of all the beams. After this operation the algorithm finds the beam that have maximal calculated error and check whether this error is greater than the maximal permission error. If this condition is true, the beam is excluded from the approximate calculation otherwise this beam is included in the approximate calculation.

Figure 8:
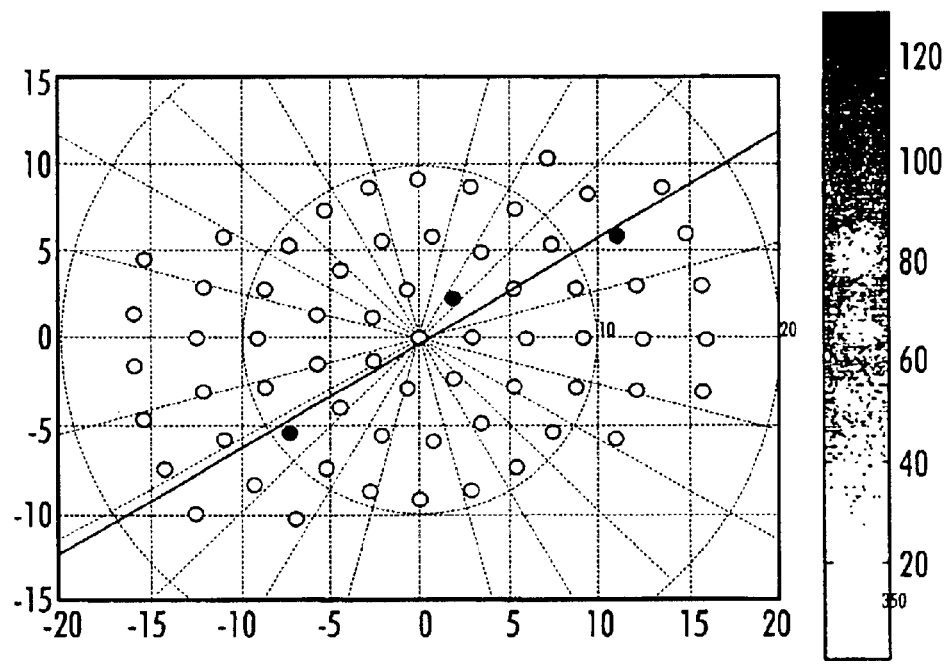
FIG. 8—chart representing the GEO orbit, approximated with a first order curve (straight line)
Figure 9:
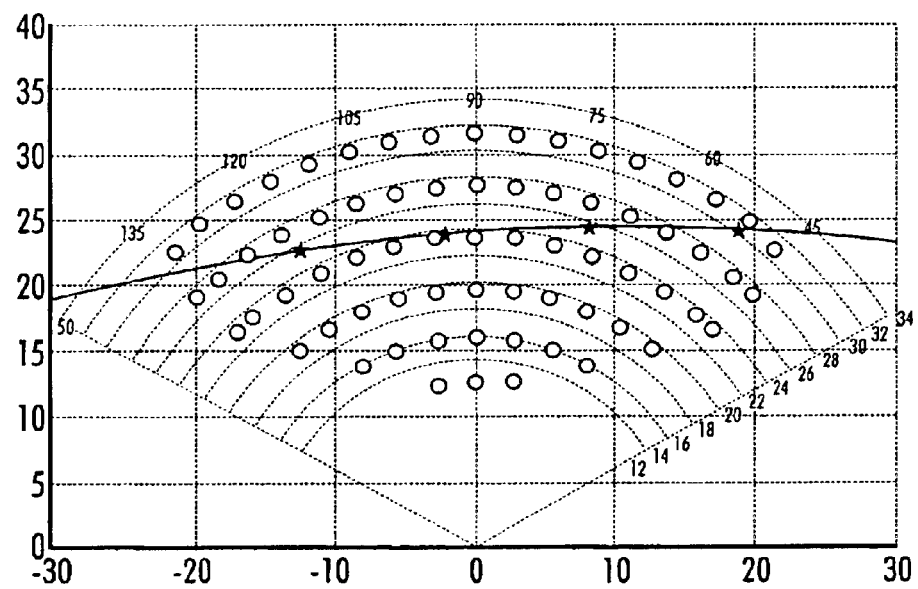
FIG. 9—chart representing the GEO orbit, approximated with a curve of second order.

The GEO orbit, approximated with first order curve (straight line) is shown on FIG. 8. It is possible to perform approximation with second order curve, which case is shown on FIG. 9.

Figure 10:
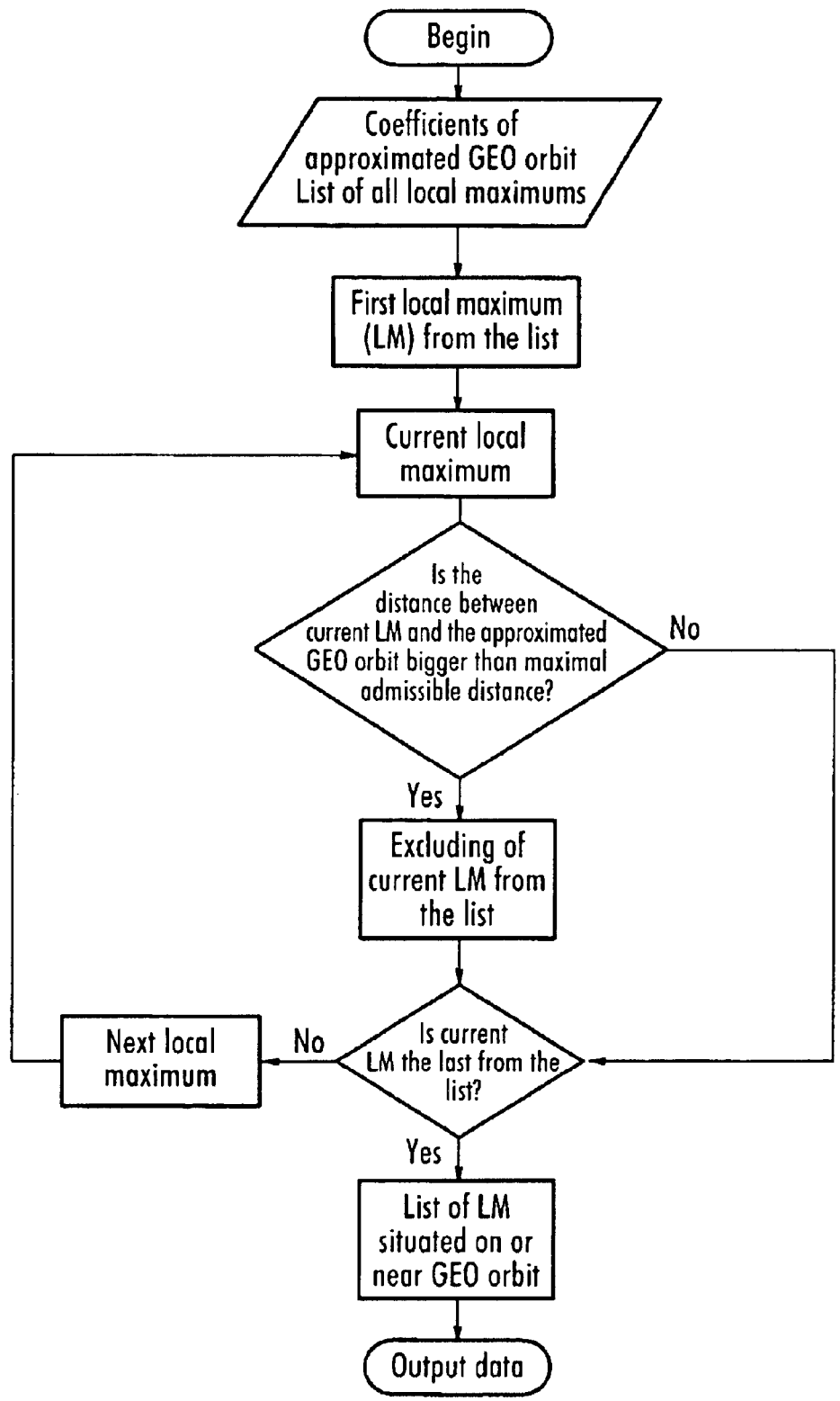
FIG. 10—flowchart representing the algorithm for detecting of the local maximums, situated in the range of the approximated GEO orbit.

After approximation of the GEO orbit, the algorithm continues with detecting of local maximums, situated on or in defined range of the approximated GEO orbit (FIG. 10). For this purpose are used already calculated coefficients of the approximated GEO orbit and the list of the local maximums. It checks consecutively all the local maximums from the list. The local maximums that are situated at a distance from the approximated GEO curve smaller than the maximal admissible distance are selected. Using this method, the algorithm composes list of local maximums, situated on the approximated GEO orbit.

Figure 11:
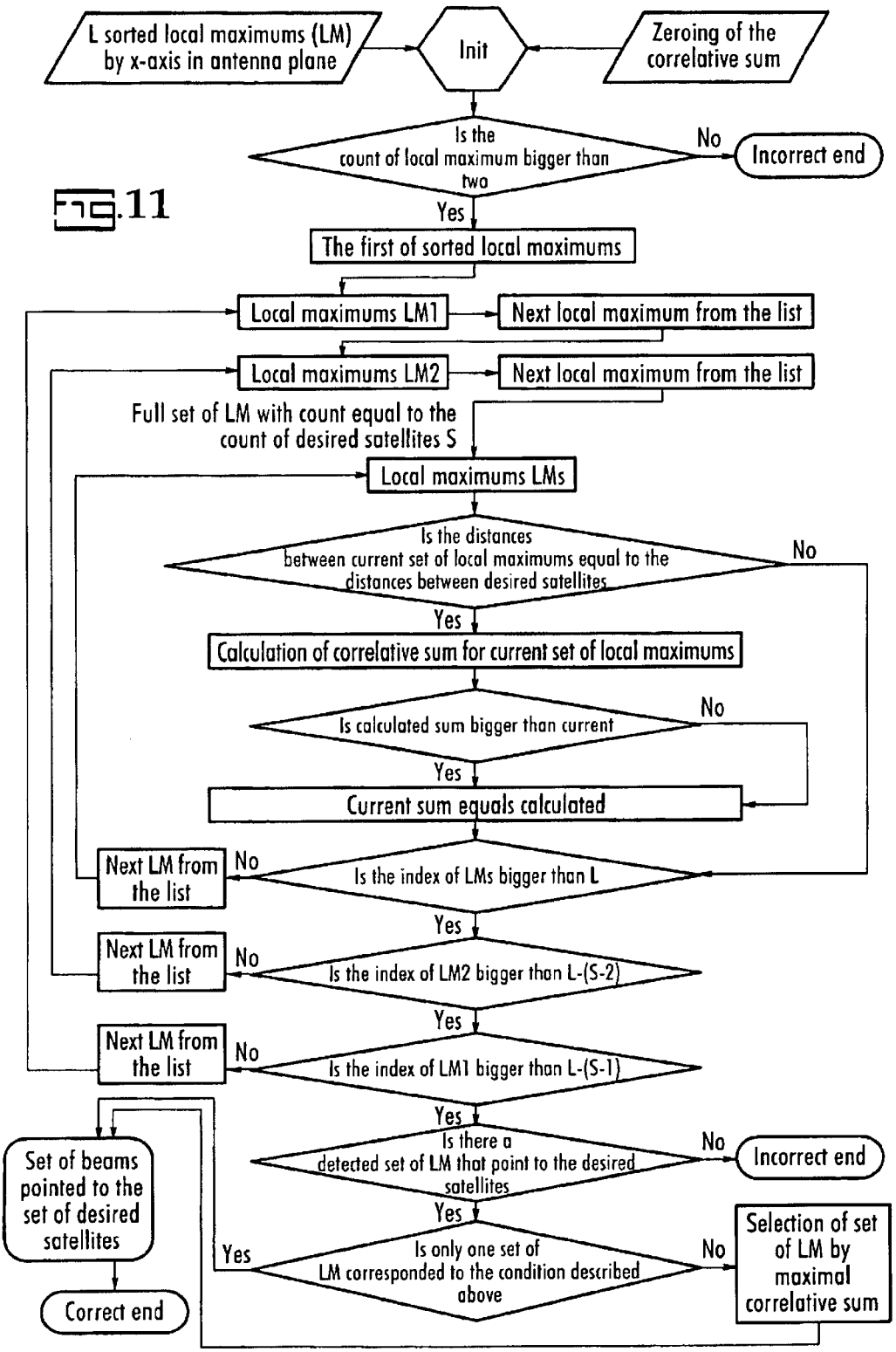
FIG. 11—flowchart representing the satellites identification algorithm.

Besing on the already determinated list of the local maximums, the algorithm realizes satellite's identification that is shown on FIG. 11. The local maximums are sorted by their X axis coordinates in the antenna plane. When the number of the local maximums is bigger than 2, the algorithm estimates consecutively the distance between the current set of local maximums and if it is equal of the distance between the desired group of satellites then correlative sum for this current group is calculated. After this procedure, the algorithm selects the group of local maximum that have the biggest calculated correlative sum (maximal correlative sum). This group contains the beams that point to the desired group of satellites.

Figure 12A:
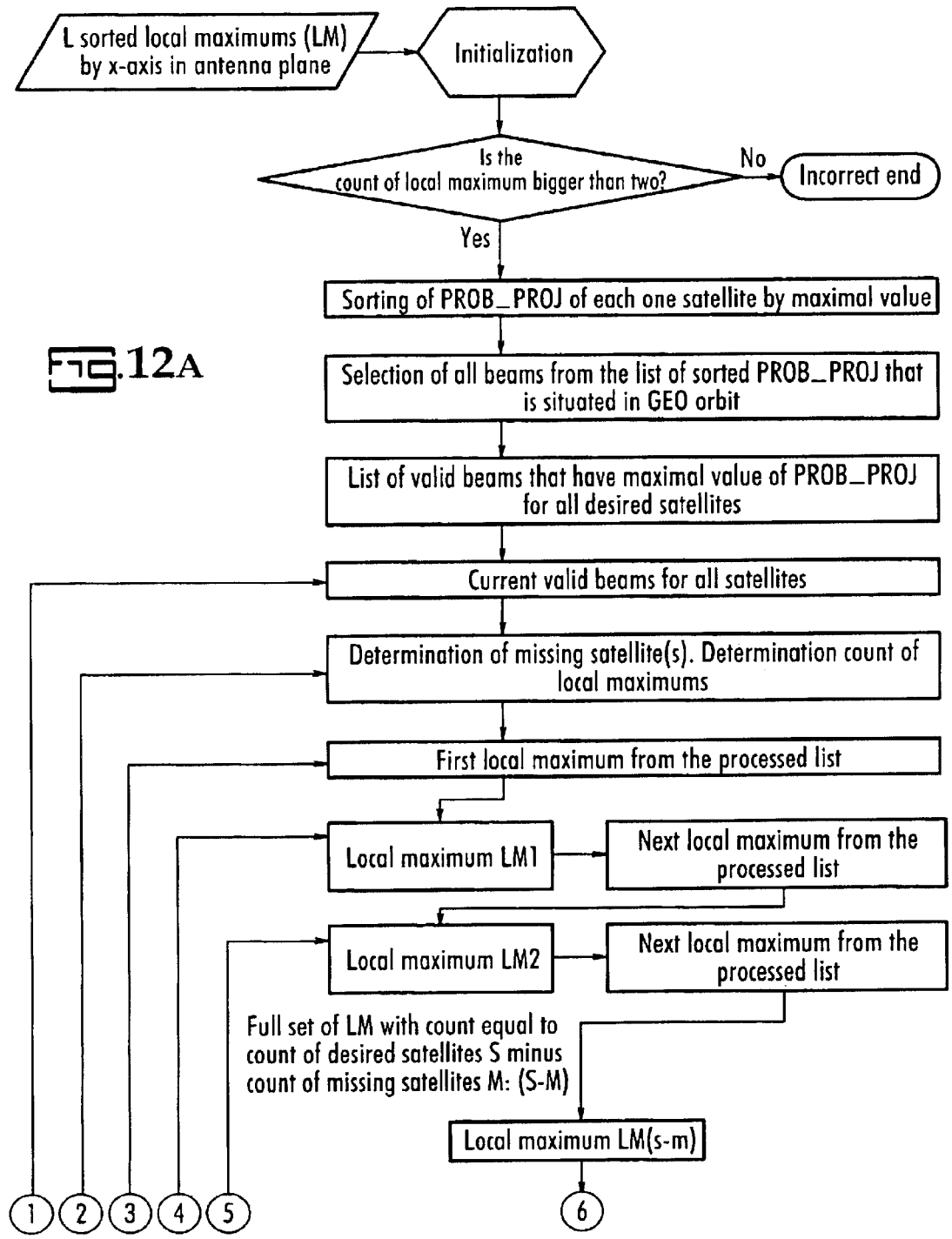
FIGS. 12a, 12b and 12c—flowcharts representing the algorithm for satellites identification in critical circumstances.
Figure 12B:
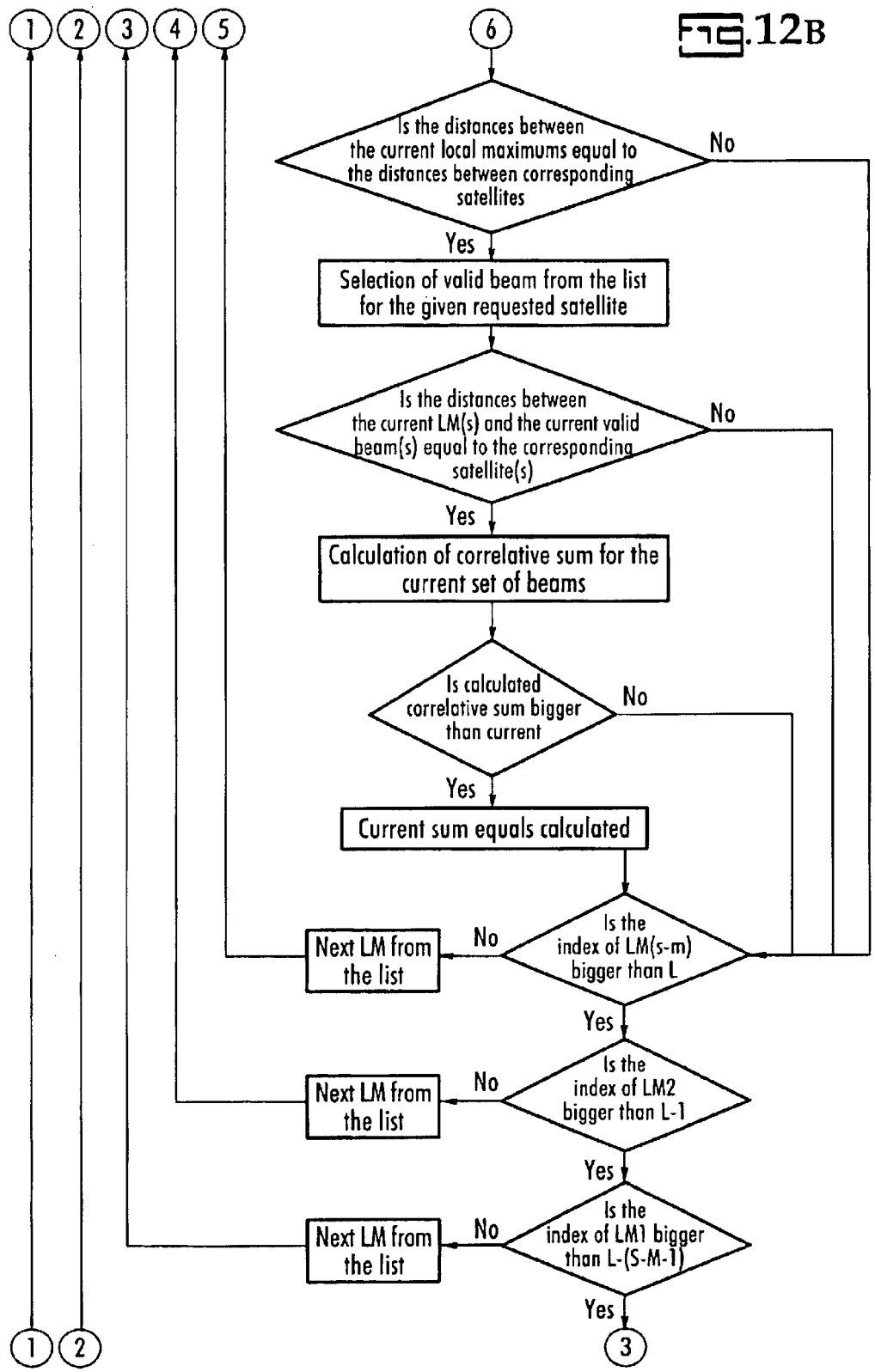
Figure 12C:
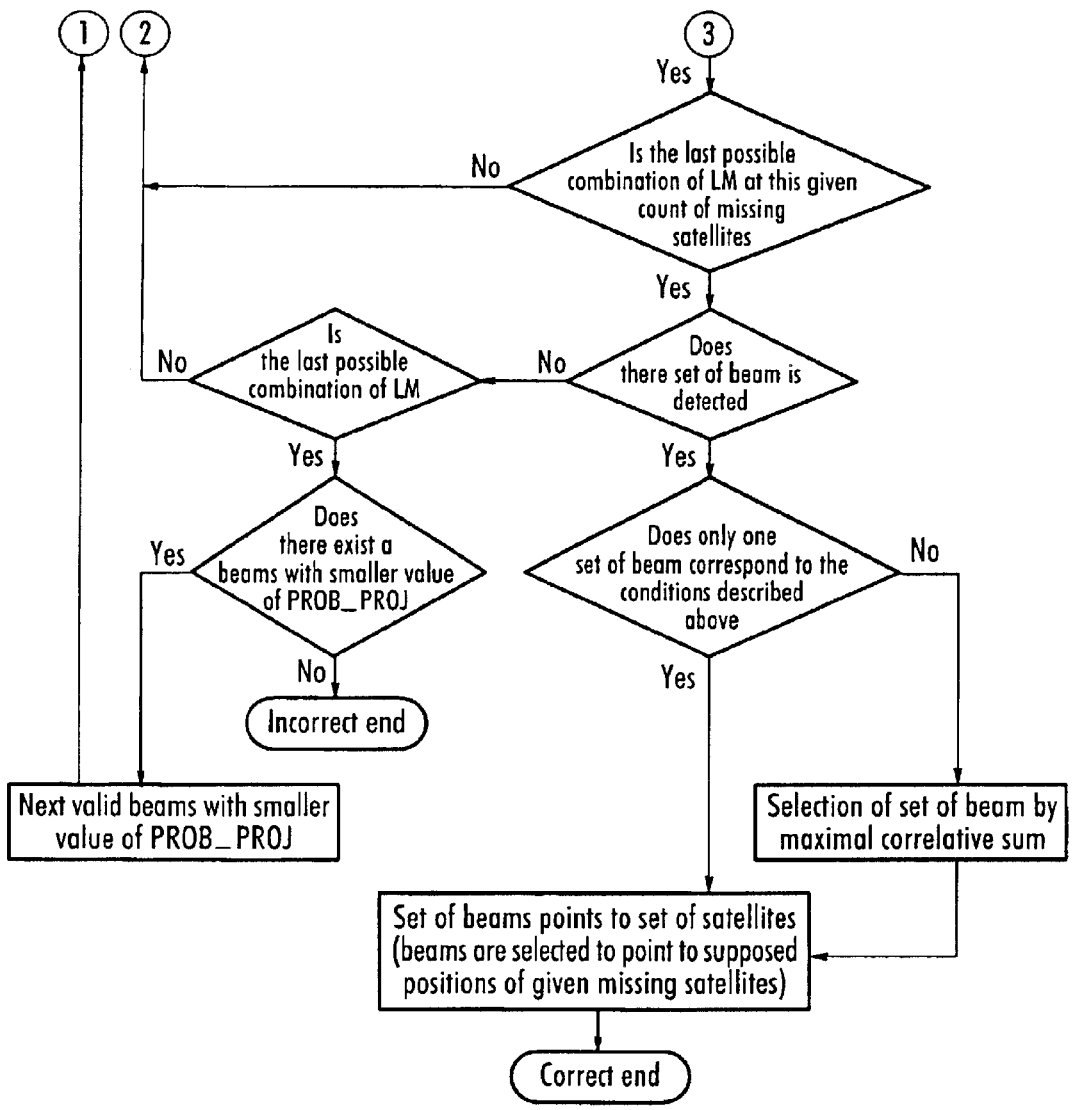
Figure 13B:
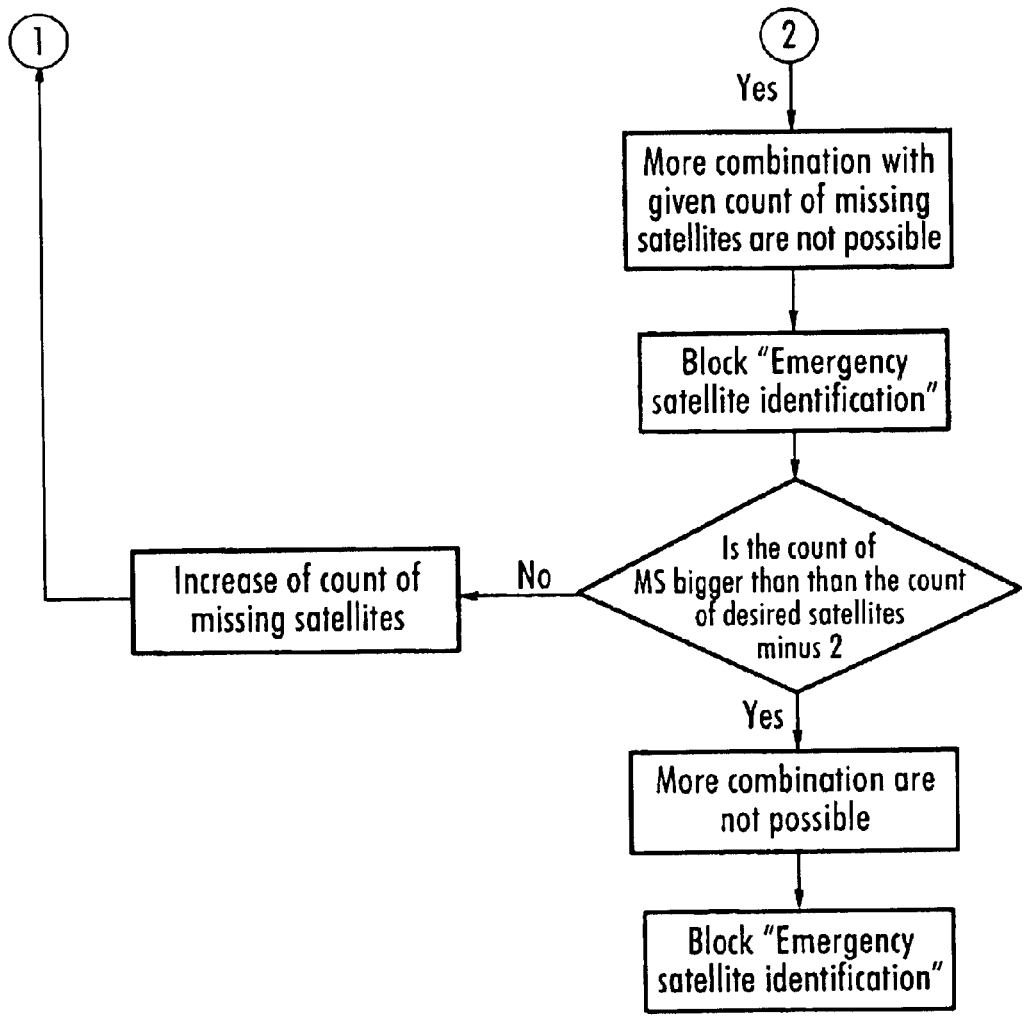

If described above algorithm identifies count of satellites smaller than desired in the algorithm, begins the algorithm shown in FIGS. 12a, 12b and 12c. This algorithm like described in FIG. 11 aims to define a group of beams that point to satellites group. Insufficiency of input data like local maximums is complemented with data of type probability. This data consists of beams selected according to the projection probabilities of the given satellites (PROB_PROJ) and situated in defined range of the approximated GEO orbit, called PP_valid beams. In case of absence of satellites signals, artificial (non-existing) beams—PP_valid beams are selected, which point to the missing satellites. The algorithm evaluates consecutively the distances between currents local maximums and if it is necessary, the group of beams is complemented by PP_valid beams (FIGS. 13a and 13b). If the calculated distance is equal of the distance between the corresponding satellites, the correlative sum for a given group of beams is calculated. After estimation of the correlative sums of all the groups of beams, the algorithm selects the group that has the biggest calculated correlative sum (maximal correlative sum). This group contains beams that point to the desired satellite's group and beams that point to the probable position of the missing satellites.

Determination of the called PP_valid beams is performed by the algorithm shown of FIGS. 13a and 13b(Block "Finding of missing satellites"). Satellites will not received signal for, the algorithm searches fictitious (non-existing) beams that pointing them. The minimum count of satellites, which should received signal from is two. The fictitious beams must to be located on or in defined range of the approximated GEO orbit and to have a probability projection value (PROB_PROJ) for the given satellites. On the base of the local maximums (beams that point to satellites, which are received signals from) and PP_valid beams (beams that point to missing satellites) is defined group of beams, which correspond to given conditions. And they are that the distance between PP_valid beams and the other beams (the local maximums) that point to satellites should be in given range, defined from the minimal and maximal permissible distance between each two satellites in the antenna plane.

Figure 14:
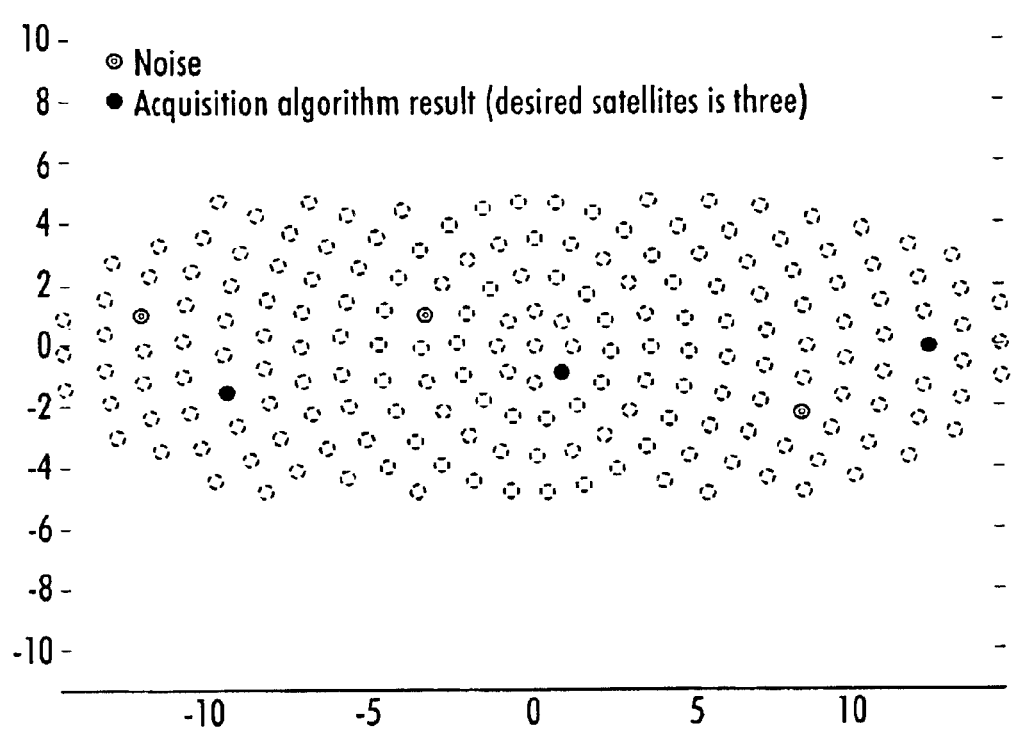
FIG. 14—chart representing the result of satellites identification method.

FIG. 14 shows the results of the identification algorithm. In this case, the count of desired satellites is three.

What is claimed is:

1. Method for identification of set of satellites, arranged on GEO orbit, in which are received signals radiated from the satellites, characterized by the following features:

determination of antenna beams strength detection of local maximums according to the antenna structure, defined by the number of the beams and their coordinates in the antenna plane;

approximation of the GEO orbit using the strength of the received signals in which the satellites identification is carried out by local maximums located on or in defined range of the approximated GEO line, and according to the information for the geographic position of each satellite and antenna orientation.

2. Method for satellites identification according to claim 1, characterized by projection probability coefficients i.e. given satellite to be projected in given area of the antenna plane, used for satellites identification.

3. Method for satellites identification according to claim 1 or 2, characterized by the possibility for correction of the information for the geographic position of each satellite by Azimuth, Elevation and Roll angles, according to inaccuracy of antenna installation.

4. Method for satellites identification according claim 1, characterized by introduction of correction of the signal/noise ratio at determination of the signal strength level of each beam.

5. Method for satellites identification according claim 4, characterized by amplification of the signal corresponding to the strength of the received signal, by square or bi-square law.

* * * * *